United States Patent [19]

Zambrano

[11] 4,395,315

[45] Jul. 26, 1983

[54] RECOVERY OF NICKEL FROM WASTE MATERIALS

[75] Inventor: Adolfo R. Zambrano, Hibbing, Minn.

[73] Assignee: The Hanna Mining Company, Cleveland, Ohio

[21] Appl. No.: 322,631

[22] Filed: Nov. 18, 1981

Related U.S. Application Data

[63] Continuation of Ser. No. 143,781, Apr. 25, 1980, abandoned, which is a continuation-in-part of Ser. No. 44,558, Jun. 1, 1979, abandoned.

[51] Int. Cl.³ .............................................. C25C 1/06
[52] U.S. Cl. ..................................... 204/112; 423/150
[58] Field of Search ...................... 423/150, 145, 146; 75/115, 119; 204/112; 252/413, 414, 416

[56] References Cited

U.S. PATENT DOCUMENTS

| | | | |
|---|---|---|---|
| 1,306,871 | 6/1919 | Nicolaas | 252/412 |
| 2,726,151 | 12/1955 | Kern | 75/0.5 |
| 2,829,965 | 4/1958 | Castagna et al. | 75/109 |
| 3,466,144 | 9/1969 | Kay | 423/150 |
| 3,567,433 | 3/1971 | Gutnikov | 75/103 |
| 3,926,842 | 12/1975 | Suggitt et al. | 252/411 |
| 4,009,101 | 2/1977 | Hayashi | 210/28 |
| 4,029,495 | 6/1977 | Hirayama | 75/10 R |
| 4,089,806 | 5/1978 | Farrell et al. | 252/413 |
| 4,120,698 | 10/1978 | Atchison et al. | 75/82 |
| 4,145,397 | 3/1979 | Toida et al. | 423/150 |
| 4,195,065 | 3/1980 | Duyvesteyn | 423/150 |

OTHER PUBLICATIONS

Habashi, *Extractive Metallurgy*, vol. 2, Gordon & Breach, New York (1970), pp. 175–176.
*Chemical Abstracts*, vol. 86 (1977), No. 45888n.
Foster et al., "The Demetalization of Cracking Catalysts", *I & ES Product Research and Development*, vol. 2, No. 4, Dec. 1963, pp. 328–332.

*Primary Examiner*—Brian E. Hearn
*Attorney, Agent, or Firm*—Maky, Renner, Otto & Boisselle

[57] ABSTRACT

A method for recovering nickel from a waste material containing nickel and small amounts of iron or aluminum or a mixture thereof comprising the steps of:
(a) removing the organic impurities from the waste material;
(b) leaching the material with an acid after removal of organic impurities to provide an acid solution;
(c) precipitating said iron and aluminum from the acid solution; and
(d) recovering nickel from the acid solution.

6 Claims, 3 Drawing Figures

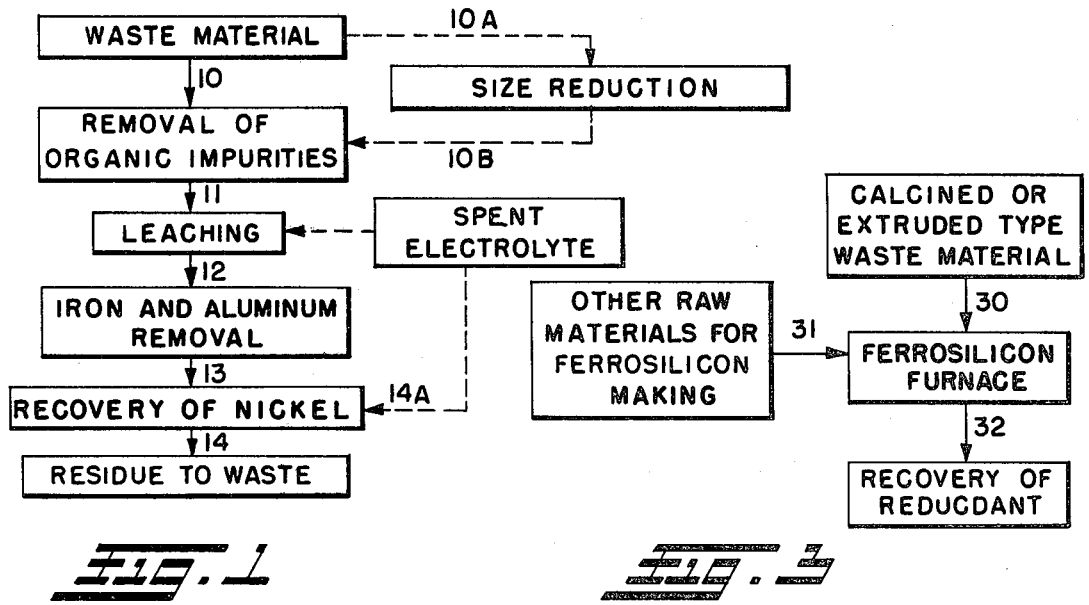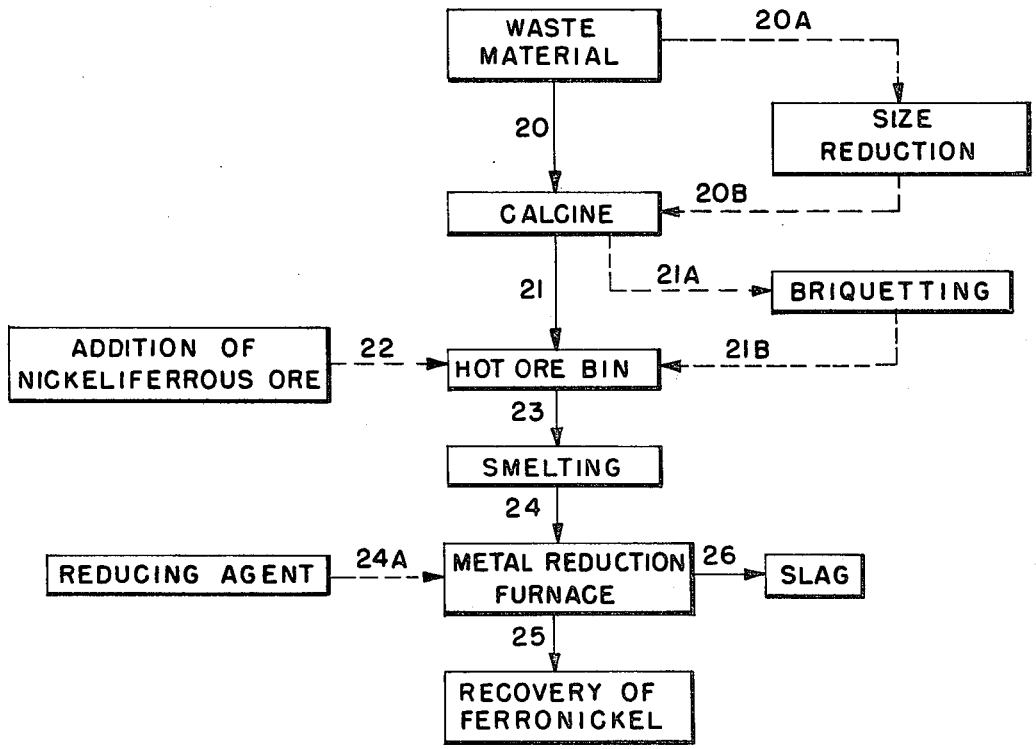

RECOVERY OF NICKEL FROM WASTE MATERIALS

This is a Continuation of application Ser. No. 143,781, filed Apr. 25, 1980, which is a Continuation-in-Part of application Ser. No. 044,558, filed June 1, 1979, both now abandoned. The disclosures of these prior applications are hereby incorporated by reference in this application in their entirety.

BACKGROUND OF THE INVENTION

This invention relates to a novel method for recovering nickel and ferronickel from waste materials and spent catalysts containing nickel and more particularly, to an inexpensive and novel method for improving the nickel content and/or production of ferronickel.

As is well known to those skilled in the art, nickel-containing catalysts are used in many reactions such as hydrogenation reactions, alkylation reactions, hydroalkylation reactions, cracking processes, etc. Initially, these catalysts perform at a high level, but as the reaction proceeds, the catalyst becomes less active. Eventually, the activity of the catalyst decreases to a point where it is not sufficiently effective to be used in a commercial process.

A wide variety of nickel catalysts and modifications thereof have been described in the art in which they are utilized. Nickel catalysts are used extensively in hydrogenation reactions such as in the hydrogenation of unsaturated organic compounds. Usually, catalysts which are used in hydroalkylation reactions will contain in addition to nickel, other metals such as tungsten. Nickel catalysts used in cracking operations often contain molybdenum and other elements. Other nickel catalysts may contain iron and/or aluminum in small amounts.

Considerable research has been conducted on methods for regenerating spent catalysts and/or recovering nickel from spent catalysts and other nickel-containing waste materials since nickel is an expensive metal to be discarded and, moreover, the safe disposal of waste nickel requires consideration of environmental hazards. Several procedures have been described in the prior art for regenerating spent catalysts. U.S. Pat. Nos. 1,306,871; 3,926,842; 4,029,495 and 4,120,698 are examples of such disclosures.

One of the difficulties involved in regenerating spent nickel catalysts results from the presence of reaction contaminants such as the various organic materials being treated by the catalyst systems. One method for removing the organic products which contaminate the spent catalysts is by burning off these organic materials at the same time that any nickel in elemental form is oxidized to form nickel oxide. U.S. Pat. No. 1,306,871 describes such a process for oxidizing spent nickel catalysts to remove organic material and form nickel oxide. The patent also describes the transformation of the nickel oxide to nickel by reduction in a current of hydrogen at a temperature of about 300° C.

The regeneration of a nickel catalyst from spent catalyst is tedious, time consuming, and requires careful attention to the details of the procedure. Therefore, there continues to be a need for methods of recovering nickel from spent catalysts which provide for the inexpensive recovery of the nickel in a usable form.

Nickeliferrous ores, in particular laterite ores containing nickel, have been treated pyrometallurgically to recover ferronickel. One example of a pyrometallurgical process for recovering ferronickel from nickel laterite ores involves operation steps whereby the ore is dried, ground to a powder, calcined, smelted, and finally subjected to reducing conditions to form ferronickel which is separated from the slag.

The amount of ferronickel and the amount of nickel in the ferronickel obtained by such pyrometallurgical processes will depend upon a variety of factors such as the nickel content of the ore, the type and amount of impurities in the ore, and various process parameters, many of which can be varied in accordance with the techniques known to those skilled in the art. It generally is desirable to produce ferronickel having a high concentration of nickel.

SUMMARY OF THE INVENTION

This invention relates to a simplified process for recovering nickel or ferronickel from waste materials containing nickel, and more particularly, to an inexpensive method for recovering nickel from spent catalysts in a nickel or ferronickel producing operation. The nickel-recovery method of this invention comprises the steps of:
(a) removing the organic impurities from waste material;
(b) leaching the material with an acid after removal of organic impurities to provide an acid solution;
(c) precipitating said iron and aluminum from the acid solution; and
(d) recovering nickel from the acid solution.

To recover ferronickel, the method of this invention comprises the steps of:
(a) calcining the prepared waste material at a temperature of about 200°-600° C.;
(b) mixing an ore containing nickel and iron with the calcined material;
(c) smelting the mixed ore and waste material in a smelting furnace;
(d) reducing the smelted material in a metal reduction furnace; and
(e) recovering the ferronickel from the furnace.

The addition of nickel-containing ores to the nickel waste materials in accordance with the method of the present invention generally results in one production of ferro-nickel with increased nickel content.

BRIEF DESCRIPTION OF THE DRAWINGS

In the annexed drawings

FIG. 1 shows a process flow diagram of the recovery of nickel from a waste material;

FIG. 2 is a process flow diagram of the invention where ferronickel is produced from nickel containing waste materials and nickeliferrous ores; and FIG. 3 is a process flow diagram of recovering a reductant from nickel containing waste material which can be added to the reduction furnace in FIG. 2.

DESCRIPTION OF THE PREFERRED EMBODIMENTS

Any waste materials containing nickel (in oxidized or oxidizable form) can be used in the process of the invention. Preferably the waste material contains material which is easily burned and produces substantial heat values on burning. Spent nickel catalysts particularly are useful in the method of the invention, and these may be any spent nickel catalysts available from any source and particularly from various industrial processes which utilize nickel catalyst systems. The nickel-containing spent catalysts may be obtained from hydrogenation, alkylation, hydroalkylation and cracking processes, and the degree to which the catalysts have been used in the processes is immaterial to their use in the method of the invention. The process of this invention is applicable to waste materials which are supported catalysts even though the presence of the inorganic support materials adds to the amount of impurities which must be separated from the nickel in accordance with the process of the invention. Moreover, the nature of the contaminants, most often organic compounds and products, does not deter from the use of the spent catalysts in the method of the invention. The organic compounds are burned away in the method of the invention. Samples of organic materials which often are present in spent catalyst products are fatty materials such as vegetable or fatty oils, and other edible or inedible oils. Nickel catalysts have been found to be useful and are used extensively in hydrogenation of unsaturated fatty oils. Thus, this commercial application of nickel catalysts provides a ready source of inexpensive spent catalysts for use in the method of the invention.

Spent nickel catalysts containing oily contaminants have been found to be particularly useful since the heat values of the oils are utilized as a heat source in the process of the invention. Spent nickel catalysts contaminated with oils can be obtained from oil processors such as Armak Chemical Division, Morris, Illinois; Proctor and Gamble, Cincinnati, Ohio; Anderson Clayton Foods, Jacksonville, Illinois, and Cambra Foods, Lethbridge, Canada. Such waste materials contain, for example, from about 4% to 20% or more nickel and have fuel values of up to about 11,000 BTU/lb. preferably 6,000 to 11,000 BTU/lb.

The method of recovering nickel or ferronickel in accordance with the invention is illustrated in the accompanying drawings.

FIG. 1 illustrates a general method of the invention where the nickel-containing waste material is treated, as indicated by arrow 10 to remove any organic impurities which may be present in the waste material.

Optionally, depending on the size of the starting waste material, the waste may be prepared as indicated by broken arrow 10A to reduce particle size and to provide increased surface area by any mechanical means and then treated to remove organic impurities as shown by broken arrow 10B. For example, the waste material may be processed through a pug mill or a hammer mill to the mesh size desired. Preferably, the screen size would be about a 10 mesh, although depending upon the waste material, screens providing more or less coarse waste material may be employed with the method of this invention. The appropriate screen and particle size of the waste material to be used in the method of this invention may be readily determined by one skilled in the art.

Depending upon the consistency of the waste material and the amount of organic contaminants therein, the organic impurities may be removed by washing with a solvent, generally a Stoddard solvent, which is known to those skilled in the art. When the waste material is heavily contaminated with organic impurities, it has been found preferable to remove such organics by calcining the waste material at about 200°–600° C., preferably about 400°–500° C. It is not necessary to remove all of the organic impurities before acid leach because the acid leach will destroy residual organic material.

After removal of the organic impurities, the waste material is advanced to the leaching step as indicated by arrow 11. The nickel is leached with an acid, preferably with sulfuric acid. The acid requirements of the leaching bath are dictated by the stoichiometry of the reaction

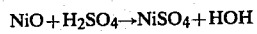

$$NiO + H_2SO_4 \rightarrow NiSO_4 + HOH$$

Preferably, the acid concentration of the leaching bath is in slight excess of the stoichiometric requirements, so as to provide a leaching bath with a pH of about 1. The temperature of the acid leaching bath during leaching is about 50° to 100° C. and preferably about 70° C.

Leaching is continued until no significant nickel concentration remains in the bath residue. The residual nickel concentrations may be determined by one skilled in the art using known techniques. During the final stages of leaching as indicated by arrow 12, iron and aluminum are precipitated by adjusting the pH of the acid leaching bath with a base, preferably sodium hydroxide, to about 2.5 to 3.5, and generally to about pH 3.0. One of the reasons why sodium hydroxide is preferred is that it can produce sodium sulfate which is needed for efficient electrowinning of nickel and reacts with ferric ions to precipitate sodium jarosite, $Na_2(Fe(OH)_2)_6(SO_4)_4$ which entrains other impurities as well. In general, the base treated leach solution is stirred at an elevated temperature (100°–200° C.) in an oxygen atmosphere, preferably in an autoclave at an operating pressure of from about 100–200 psig although other pressures and temperatures can be utilized. Alternatively, though not shown in the drawings, the base treated leach solution can be advanced directly to the electrowinning step and the impurities are removed after electrowinning.

The leached nickel is recovered as indicated by arrow 13 such as by counter-current decantation which produces a pregnant electrolytic feed, from which electrolytic nickel is recovered by electrowinning. The residue from the nickel recovery is discarded as waste, as indicated by arrow 14 and the spent electrolyte optionally is returned to the leaching step as indicated by broken arrow 14A. In an alternative procedure, the nickel waste material is not calcined following particle size reduction.

Turning now to FIGS. 2 and 3 which illustrate the method of this invention for producing ferronickel, FIG. 2 depicts alternative methods for recovery of ferronickel from various types of nickel catalyst waste materials. For recovering ferronickel from spent nickel catalysts which have relatively low surface area, it has been found useful to reduce the particle size and to increase the surface area of the spent catalyst as indicated by broken arrow 20A followed by feeding the prepared catalyst, as indicated by broken arrow 20B, into a calciner. Alternatively, if the waste material is of suitable size and surface area, it is fed directly into the calciner as indicated by arrow 20.

The spent catalyst is calcined at a temperature of about 200° to 600° C., and preferably from about 400° to 500° C. The calcined material is advanced to hot ore bins as indicated by arrow 21 or optionally is first briquetted 21A so as to reduce the generation of fine dust which otherwise could result due to the small particle size of the catalyst materials. If the calcined material is briquetted, the briquetting is followed by advancement of the material into hot ore bins (broken arrow 21B).

Nickel-containing ores are added to the hot ore bins as indicated by arrow 22.

The nickel-containing ores which are useful in the method of the invention for preparing ferronickel may be any of the naturally occurring ores which contain sufficient nickel to justify the expense of the recovery of the nickel. One of the most common nickel-containing ores are the nickeliferrous ores or the lateritic ores. The lateritic ores which are useful in the method of the invention are oxide complexes containing small amounts of nickel and cobalt while containing iron and substantially larger amounts of magnesia and silica. The nickel content of these lateritic ores varies over a wide range. While in the better deposits, the average nickel content may reach or even exceed 2 to 3% nickel, it is in the range of 1 to 2% nickel in the great majority of the known lateritic nickel ore reserves. An example of a nickeliferrous lateritic ore is the ore deposits found in the Riddle, Oregon region. A typical Riddle nickel laterite ore analysis by weight, after drying is about 0.7–1.8% nickel, 0.01% cobalt, 0.3 to 1.0% chromium, 7 to 13% iron, 24 to 32% magnesium, 45 to 50% silica and about 6 to 7.5% loss on ignition. The amounts of these components will vary somewhat depending upon the source of the ore and any preliminary benefication treatment. In general, the method of this invention can be conducted on nickeliferrous ores containing from 0.5 to 2 or even 3% of nickel although the process can be conducted on ores containing higher amounts of nickel when available.

The nickel-containing ores used in the method of the invention preferably are coarsely ground to the mesh size which is found to be suitable in the method of the invention. Because the natural ores recovered from the ground are wet, the ore generally will be dried prior to grinding to reduce the moisture content. The moisture content of the ore should be reduced to below about 5% and is preferably reduced to about 2–3%. The desired particle size is one which provides for ease of handling and for obtaining maximum nickel recovery. The optimum size for each particular ore is a function of the ore mineralogy and natural grain size distribution, and may be determined readily by one skilled in the art.

The mixture of calcined waste material and nickeliferrous ore prepared in the hot ore bin is advanced to a smelting furnace (arrow 23) and smelted at an elevated temperature such as about 1670° C. The smelted material is advanced, as indicated by arrow 24, to a metal reduction furnace. Reduction of the nickel is accomplished in the reducing container by adding a reducing agent as indicated by arrow 24A with vigorous mixing action to provide good contact between the reducing agent and the molten material from step 24. Alternatively the reducing agent, mixed ore and calcined spent catalyst can be briquetted or agglomerated and then fed to the smelting furnace. Examples of preferred reducing agents which may be added to the melt include silicon, ferrosilicons and an aluminum-iron-nickel-silicon alloy prepared from a spent nickel catalyst as described more fully below with respect to FIG. 3. Carbon may also be employed as a reducing agent particularly where a submerged arc furnace is used. Ferrosilicons containing about from 45 to 55% silicon particularly are useful. When the vigorous mixing is completed, the ferronickel is allowed to settle to the bottom of the container and slag is skimmed off the top and removed as indicated by arrow 26. As the reducing reaction continues, ferronickel accumulates in the reducing container and is removed as shown by arrow 25.

FIG. 3 illustrates a method for recovering a reductant from nickel containing waste material which can be added to the metal reduction furnace as depicted by arrow 24A in FIG. 2. Either calcined or extruded spent nickel catalyst is fed 30 with other raw materials 31 to a ferrosilicon type furnace where the mixture is reduced and smelted at a temperature of about 1750° C. The produced reductant, an aluminum-iron-nickel-silicon alloy is recovered 32 by techniques known to those skilled in the art. This metallic reductant can be added, as desired, to a metal reduction furnace as indicated by arrow 24A in FIG. 2 during the recovery process for ferronickel, or may be added to any process in which an aluminum-iron-nickel-silicon reductant is useful.

The following examples illustrate the procedure of the invention for removing organic impurities from the waste materials containing nickel and thereafter leaching the nickel from the material.

EXAMPLE 1

A spent nickel catalyst sample (50 grams) analyzing 14.5% Ni; 0.55% Fe; 28% $SiO_2$; 4% $Al_2O_3$; 16.9% C; 47.4% L.O.I.; and with a calorific power of 7,400 BTU/lb. is roasted at 400° C. for 3 hours. The calcine containing about 27.5% Ni is leached at 70° C. for 90 minutes with $H_2SO_4$ at a level of 1400 lb. of acid per short ton of calcine and at a 33% initial pulp density. The mixture is filtered and the filtrate is analyzed. The results are summarized in Table I. The assay of liquid is reported in gpl and solids in percent by weight.

TABLE I

| Products | Amount | Assay, % or gpl | | Extraction % |
| --- | --- | --- | --- | --- |
| | | Fe | Ni | Ni |
| Filtrate | 500 cc | 0.113 | 26.3 | 96.0 |
| Residue | 27.2 g | — | 2.02 | |

EXAMPLE 2

Fifty grams of another silica matrix spent nickel catalyst is leached with Stoddard solvent at 75° C. to remove the paraffin-like hydrocarbons. The leach residue, analyzing 5.7% Ni is then leached at 70° C. for 120 minutes with $H_2SO_4$ at a level of 700 lb/STon and 33% initial pump density. The mixture is filtered, and the filtrate and residue are analyzed. The results are summarized in Table II.

TABLE II

| Products | Amount | Assay, % or gpl | | Extraction % |
| --- | --- | --- | --- | --- |
| | | Fe | Ni | Ni |
| Filtrate | 500 cc | 0.032 | 5.86 | 96.7 |
| Residue | 36.2 g | — | 0.259 | |

EXAMPLE 3

A leach solution obtained from leaching a calcined spent nickel catalyst with sulfuric acid is treated with sodium hydroxide to adjust the pH=3.2 at 23° C. A 500 ml sample is transferred into an autoclave and reacted for 30 minutes at 150° C. under an operating pressure of 150 psig of which about 100 psig is due to oxygen. After treatment the solution shows a pH=2.7 at 90° C. The results of this test are as follows.

TABLE III

|  | Ni | Fe | Al | SiO$_2$ |
|---|---|---|---|---|
| Feed Solution, 500 cc | 58.65 gpl | 1.734 gpl | 6.01 gpl | 0.119 gpl |
| Purified Solution, 500 cc | 58.4 gpl | 0.172 gpl | 0.0128 gpl | 0.082 gpl |
| Residue, 11.4 grams | 1.11 Wt. % | 6.85 Wt. % | 26.31 Wt. % | 0.162 Wt. % |
| Impurities Removal: |  | 90.1 Wt. % | 99.8 Wt. % | 31.1 Wt. % |

The embodiments of the invention in which an exclusive property or privilege is claimed are defined as follows:

I claim:

1. A method for recovering nickel from a waste material consisting essentially of nickel, small amounts of iron and aluminum and organic impurities consisting essentially of the steps of:
   (a) removing the organic impurities from the waste material by calcining said waste material at a temperature in the range of about 400° C. to about 500° C.;
   (b) leaching the calcined material from step (a) with an acid to provide an acid solution, in which the acid concentration initially is in stoichiometric excess relative to nickel, the leaching being continued in a single step until no significant nickel concentration remains in the residue of the waste material;
   (c) precipitating said iron and aluminum from the acid solution by adjusting the pH of said acid solution to about 2.5 to 3.5; and
   (d) recovering nickel from the acid solution by electrowinning.

2. The method of claim 1 wherein the waste material is leached in step (b) with sulfuric acid.

3. The method of claim 1 wherein the organic impurities comprise oils, fats, or petroleum fractions.

4. The method of claim 1 wherein the pH is adjusted by an addition of sodium hydroxide.

5. The method of claim 1 wherein the particle size of the waste material is reduced to provide increased surface area prior to removing the organic impurities in step (a).

6. The method of claim 1 wherein the waste material is a spent supported nickel catalyst.

* * * * *